Dec. 16, 1924.
A. W. CURTIS
BOW SOCKET
Filed Oct. 8, 1920
1,519,821
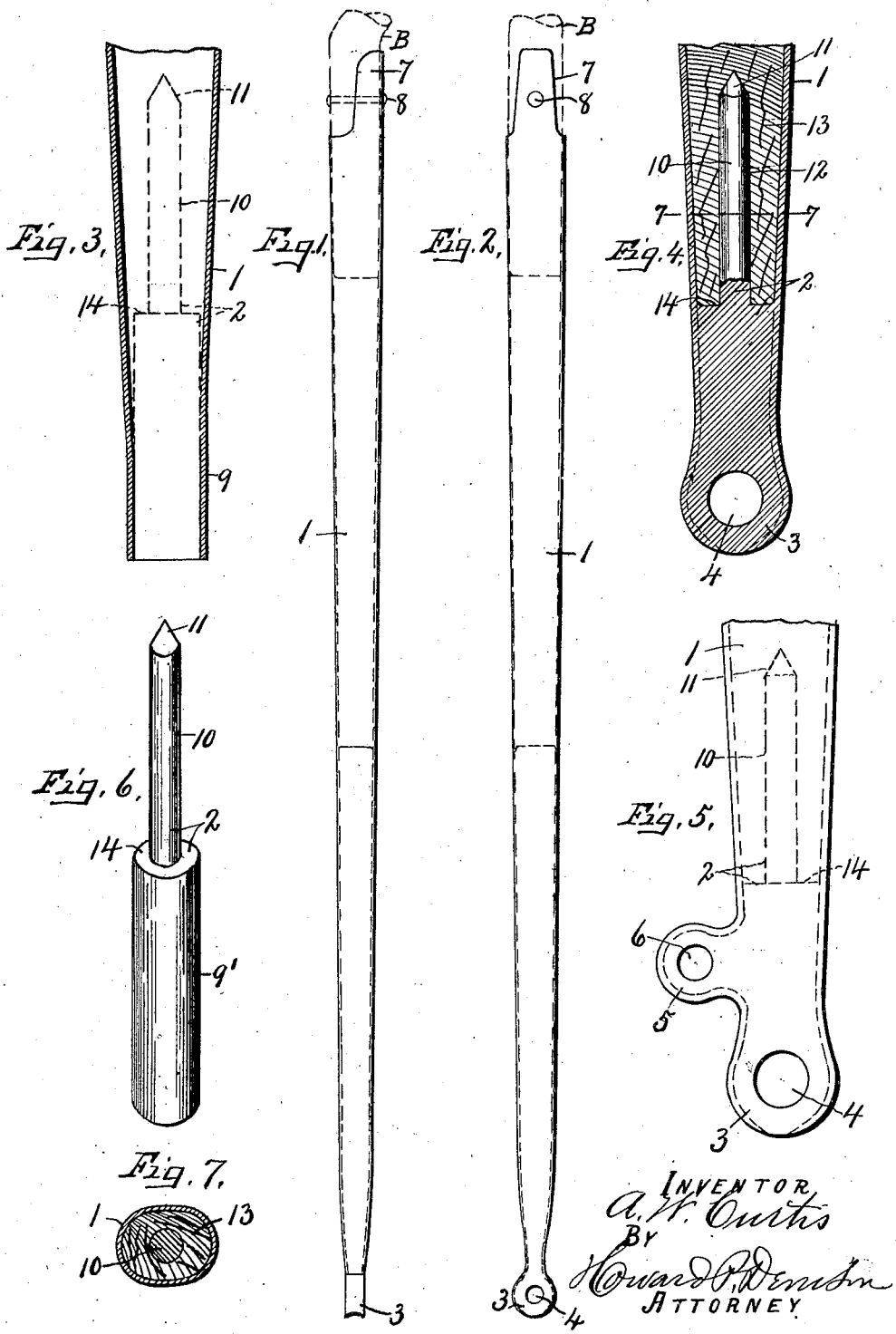

Patented Dec. 16, 1924.

1,519,821

UNITED STATES PATENT OFFICE.

ALMON W. CURTIS, OF CORTLAND, NEW YORK.

BOW SOCKET.

Application filed October 8, 1920. Serial No. 415,627.

*To all whom it may concern:*

Be it known that I, ALMON W. CURTIS, of Cortland, in the county of Cortland, in the State of New York, have invented new and useful Improvements in Bow Sockets, of which the following, taken in connection with the accompanying drawings, is a full, clear, and exact description.

This invention relates to certain improvements in bow-sockets as used more particularly in one-man tops for automobiles. These sockets are usually made of sheet metal strips bent into the form of tapered tubes and having their meeting edges overturned and interlocked with each other somewhat after the manner of the ordinary tinner's joint, in which the rib formed by the interlocking flanges is preferably at the inside of the tube, thereby forming an external groove or seam running the entire length of the tube.

The formation of this type of joint is not only difficult and expensive, but requires the use of extremely thin metal in order that the seam may be properly formed and that the rib at the inside may be as small as possible to permit the insertion of the usual wood filling and ends of the bow, and also requires the use of one or more extra tubes of practically the same length and taper inserted in the external tube for reenforcing purposes, which adds additional expense and labor to the completed socket.

After the tubes are thus formed, they are provided at their smaller ends with apertured extensions consisting of steel forgings having reduced shanks which form annular shoulders at their junctions with the main body, so that the shanks may be inserted into the small end of the tube until limited by the engagement of the annular shoulder with the end face of said tube, the shank being usually off center to rest against the interior wall of one side of the tube, leaving an intervening space at the opposite side for the reception of a wood filler which is supposed to stiffen the shank against lateral movement in the tube.

When the steel forging is inserted in the small end of the tube in the manner described, the end face of the tube is brazed or welded to the adjacent portion of the shank and annular shoulder, thus producing another perceptible joint. These joints not only detract from the smooth and unbroken appearance of the sockets and materially interfere with the proper securement of the wood fillers but also accumulate more or less moisture, which, after a short period of use causes deterioration and consequent weakening of the socket by rust.

The main object of my invention is to avoid these laborious and expensive operations and other objectionable results by making a seamless, single thickness tubular socket of sufficient thickness in itself to withstand the strains to which it may be subjected without any extra reenforcing means other than the wood filler which is commonly used in sockets of this character for stiffening purposes and also to receive any screws or rivets which may be necessary in connection with the socket for fastening other parts thereto.

Another object is to draw the small end of the tube into circular cross-sectional form of standard size to receive a relatively short section of stock rod or bar of steel of corresponding standard size, so that when inserted, the tube and section may be forged together to produce the desired means of attachment to a pivotal bolt or other fixture, whereby the entire insert will be substantially enclosed in the tube as a unitary part thereof, so that the tube with the insert therein will be continuous or unbroken from end to end and circumferentially.

Another object is to provide the steel insert with a reduced coaxial spur projecting into the tube from its inner or upper end in spaced relation to the walls of said tube for receiving the adjacent end of the wood filler which has been previously tapered and bored for that purpose, thereby permitting said wood filler to engage the walls of the tube throughout its circumference.

Other objects and uses relating to specific parts of the socket will be brought out in the following description.

In the drawings:

Figures 1 and 2 are, respectively, a front face view and a side elevation of a socket embodying the features of my invention, showing portions of the bow by dotted lines.

Figure 3 is an enlarged sectional view of the smaller end of the tube prepared for receiving the steel insert, which is shown by dotted lines in operative position ready for forging the eye or eyes from the tube and insert.

Figure 4 is a sectional view of the lower end of the completed socket with the insert and tube forged into a single eye for receiving a pivotal bolt or stud.

Figure 5 is a side elevation of a lower end of a bow socket showing the insert therein as forged with the tube into a pair of eyes for receiving pivotal bolts or studs.

Figure 6 is a perspective view of the detached insert before being inserted into the tube and forged into the desired attaching eye or eyes.

Figure 7 is a cross-sectional view taken in the plane of line —7—7—, Fig. 4.

As illustrated, this socket comprises a seamless tubular body —1— of sheet steel preferably tapered from one end to its opposite end, and a relatively short insert —2— preferably of round bar steel of standard stock size incorporated in the small end of the tube which has been previously drawn or formed to a standard size to fit closely around and upon the periphery of the larger part of the insert, the lower or outer end of which is substantially flush with the corresponding end face of the tube when first inserted therein, as shown by dotted lines in Fig. 3, after which the smaller end of the tube with the insert therein is forged together to form a substantially flat eye —3— having an opening —4— for receiving a pivotal stud or other fixture as shown in Figs. 1, 2 and 4. It is evident, however, that the same parts may be forged with an additional eye —5— having an opening —6—, as shown in Fig. 5, for receiving a pivotal bolt or stud of another similar bow socket or other part of a folding top.

The tube —1— is most economically formed from a piece of flat sheet steel bent or rolled to the desired cross-sectional shape, either oval or circular, and having its longitudinal edges abutting against each other in the same plane and permanently secured together by acetylene welding. These tubes are preferably formed upon a mandrel to standardize their construction and instead of rolling them around the mandrel and welding their edges together by the acetylene process, they may be drawn in circular form over and upon the mandrel by any suitable process. The outer or larger end of the tube is adapted to receive the adjacent end of a bow, as —B—, shown by dotted lines in Figs. 1 and 2, and is provided with a substantially semi-circular extension —7— along its inner side for attachment to the adjacent end of the bow by one or more rivets or bolts, as —8—, the further object of said extension being to guide the end of the bow on its entrance into the socket and to afford a slightly resilient brace for the bow as distinguished from an abrupt termination of the adjacent end of the socket against the bow.

As previously stated, the lower or smaller end of the tube —1— at —9— is drawn into circular form of standard size corresponding in its internal diameter to the external diameter of the main body or larger portion of the insert —2— which is inserted therein, with its lower or outer end substantially flush with the corresponding end face of the circular portion —9— preparatory to forging the two parts together to form the eye —3— and eye —5—, if desired.

The main body —9— of the insert —2— is cylindrical and of standard stock size and is provided at its upper end with a reduced stem or spur —10— terminating in a sharp point —11—, and adapted to enter a bore —12— of corresponding size and form in the end of the wood filler —13—, which is inserted in the tube from the larger end downward until it engages a shoulder —14— on the insert —2— formed by the reduced end —10—.

When the insert is placed in position in the smaller end of the tube in the manner described, the larger cylindrical portion —9— thereof, together with the adjacent portion of the tube are forged together under sufficient heat to permit them to be firmly united in forming the eye —3— and eye —5—, if desired, with the assurance that the tube will enclose practically the entire insert when the forging is completed, thereby producing a seamless tube which is continuous both longitudinally and circumferentially from end to end of the socket including the eye —3—.

A socket of this construction formed under the method described, by reason of its freedom from seams and external joints is exceedingly strong and durable, in that it permits the ends of the bow and wood fillers to be driven tightly therein without liability of opening any seams, and practically removes the liability of lodgment of moisture throughout its surface area, thereby removing the dangers of deterioration from rust, in addition to presenting a smooth and neat appearance and in greatly reducing the cost of manufacture due to the fact that the tube may be made of heavier stock and avoids the necessity of extra reenforcing tubes.

What I claim is:

A bow-socket comprising a sheet-metal tube tapered from end to end and seamless throughout its area, the larger end being open to receive the adjacent end of a bow in direct contact with its inner surface, in combination with a wooden filler-piece tightly fitted within the smaller end of the tube, and a solid metal insert also within the smaller end of the tube and having a reduced extension tightly fitted in an opening in the wooden filler-piece, said smaller end of the tube being extended to enclose the entire length of the solid metal insert and permanently welded thereto.

In witness whereof I have hereunto set my hand this 1st day of October, 1920.

ALMON W. CURTIS.

Witnesses:
H. E. CHASE,
ROSE G. CARROLL.